(12) United States Patent
Wolff et al.

(10) Patent No.: US 10,995,848 B2
(45) Date of Patent: May 4, 2021

(54) MOTORCYCLE DRIVE DEVICE WITH ADJUSTABLE BACKLASH

(71) Applicant: Bayerische Motoren Werke Aktiengesellschaft, Munich (DE)

(72) Inventors: Peter Wolff, Munich (DE); Thomas Steinle, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 81 days.

(21) Appl. No.: 16/251,305

(22) Filed: Jan. 18, 2019

(65) Prior Publication Data

US 2019/0195338 A1     Jun. 27, 2019

Related U.S. Application Data

(63) Continuation of application No. PCT/EP2017/067361, filed on Jul. 11, 2017.

(30) Foreign Application Priority Data

Jul. 25, 2016   (DE) ..................... 10 2016 213 620.8

(51) Int. Cl.
*F16H 57/12* (2006.01)
*F16H 57/022* (2012.01)
(Continued)

(52) U.S. Cl.
CPC ......... *F16H 57/12* (2013.01); *F16H 57/0031* (2013.01); *F16H 57/021* (2013.01);
(Continued)

(58) Field of Classification Search
CPC ....... F16H 2057/125; F16H 2057/0221; F16H 2057/0222; F16H 2057/0224;
(Continued)

(56) References Cited

U.S. PATENT DOCUMENTS

| 4,912,998 A * | 4/1990 | Sugano ................. F16H 57/023 |
|---|---|---|
| | | 74/409 |
| 5,094,117 A * | 3/1992 | Mikel ..................... F16B 39/10 |
| | | 74/395 |

(Continued)

FOREIGN PATENT DOCUMENTS

| CN | 1060700 A | 4/1992 |
|---|---|---|
| CN | 104633100 A | 5/2015 |

(Continued)

OTHER PUBLICATIONS

International Search Report (PCT/ISA/210) issued in PCT Application No. PCT/EP2017/067361 dated Sep. 8, 2017 with English translation (four (4) pages).

(Continued)

*Primary Examiner* — Daniel D Yabut
(74) *Attorney, Agent, or Firm* — Crowell & Moring LLP

(57) ABSTRACT

A motorcycle drive device includes a shiftable transmission set up to transmit drive power which can be provided by an engine crankshaft toward a drivable wheel. The transmission includes an input shaft having a rotation axis when is displaceable to adjust a spacing between the rotation axes of a primary gearwheel on the transmission input shaft and a primary pinion transferring the drive power from the crankshaft. A transmission input shaft bearing supporting the transmission input shaft is arranged in a bearing plate that is rotatable relative to a housing of the transmission. The bearing plate includes an adjusting mechanism arranged to change the position of the bearing plate with respect to the transmission housing to adjust the axial spacing of the rotation axes.

10 Claims, 2 Drawing Sheets

(51) Int. Cl.
*F16H 57/00* (2012.01)
*F16H 57/02* (2012.01)
*F16H 57/021* (2012.01)
*F16H 57/031* (2012.01)

(52) U.S. Cl.
CPC ......... *F16H 57/022* (2013.01); *F16H 57/031* (2013.01); *F16H 2057/0222* (2013.01); *F16H 2057/0224* (2013.01); *F16H 2057/02065* (2013.01); *F16H 2057/128* (2013.01)

(58) Field of Classification Search
CPC ..... F16H 2057/0225; F16H 2057/0228; F16H 2057/128; F16H 57/022; F16H 57/12; F16H 55/18; F16H 55/24; F16H 57/0031; F16H 2057/02065; Y10T 74/19623; Y10T 74/19898; Y10T 74/1955; Y10T 74/1954; Y10T 74/1956; Y10T 74/19565; Y10T 74/20654

See application file for complete search history.

(56) References Cited

U.S. PATENT DOCUMENTS

| | | | | |
|---|---|---|---|---|
| 5,174,169 | A * | 12/1992 | Allen | F01L 1/344 74/395 |
| 8,857,389 | B2 * | 10/2014 | Mukouhara | F01L 1/026 123/90.16 |
| 9,381,782 | B2 * | 7/2016 | Schwennsen | B60D 1/52 |
| 2004/0107788 | A1 * | 6/2004 | Kramer | F16D 15/00 74/440 |
| 2007/0012129 | A1 * | 1/2007 | Maty | F16H 57/025 74/395 |
| 2008/0047514 | A1 * | 2/2008 | Allen | F01L 1/024 123/90.17 |
| 2014/0083220 | A1 | 3/2014 | Mukouhara et al. | |
| 2015/0128745 | A1 | 5/2015 | Senda et al. | |

FOREIGN PATENT DOCUMENTS

| | | | | |
|---|---|---|---|---|
| DE | 197 50 286 A1 | 5/1999 | | |
| DE | 199 19 659 A1 | 11/2000 | | |
| DE | 10 2009 025 693 A1 | 1/2010 | | |
| DE | 10 2013 214 949 A1 | 3/2014 | | |
| EP | 1 845 287 A1 | 10/2007 | | |
| GB | 340344 A | * | 1/1931 | ............... F16H 7/14 |
| JP | 6-500005 U | 3/1994 | | |
| JP | 2006-183623 A | 7/2006 | | |

OTHER PUBLICATIONS

German-language Written Opinion (PCT/ISA/237) issued in PCT Application No. PCT/EP2017/067361 dated Sep. 8, 2017 (five (5) pages).
German-language Office Action issued in counterpart German Application No. 10 2016 213 620.8 dated Apr. 7, 2017 (five (5) pages).
Chinese-language Office Action issued in Chinese Application No. 201780029986.7 dated Jan. 26, 2021 with English translation (14 pages).

* cited by examiner

MOTORCYCLE DRIVE DEVICE WITH ADJUSTABLE BACKLASH

CROSS REFERENCE TO RELATED APPLICATIONS

This application is a continuation of PCT International Application No. PCT/EP2017/067361, filed Jul. 11, 2017, which claims priority under 35 U.S.C. § 119 from German Patent Application No. 10 2016 213 620.8, filed Jul. 25, 2016, the entire disclosures of which are herein expressly incorporated by reference.

BACKGROUND AND SUMMARY OF THE INVENTION

The invention relates to a motorcycle drive device with adjustable backlash between two gear wheels. A motorcycle drive device having a transmission is known from DE 10 2013 214 949 A1.

Motorcycle internal combustion engines often have a high speed level as compared to internal combustion engines of automobiles. For similar attainable terminal velocities of both types of vehicle, this results in the need for a greater reduction in the motorcycle transmission. A first reduction stage of the motorcycle transmission is therefore arranged in the direction of the torque transmission between a crankshaft of the motorcycle internal combustion engine and a transmission input shaft and reduces the transmission input speed. The gear wheels participating in this reduction stage have steel as one component.

A housing surrounding the reduction stage and designed to support shafts consists of aluminum, or an aluminum alloy. Such a housing normally encompasses both the crankcase of the internal combustion engine and the transmission housing. The different materials (steel/aluminum) have different coefficients of thermal expansion, which results in a temperature dependency of the backlash, since gear wheels and housing expand differently. Based on this circumstance, gear pairs with slight meshing angle ($\alpha<20°$) are usually employed for this meshing, since the backlash for these is less dependent on a change in the axial spacing. Moreover, devices are known from other applications on the motorcycle in which the backlash between two gear wheels is adjustable; DE 10 2013 214 949 A1 proposes a backlash equalizing device with an eccentric shaft for a camshaft drive mechanism.

One problem which the invention proposes to solve is to modify known drive devices of motorcycles so that a backlash of a gear pair is adjustable.

In the sense of the invention, a motorcycle drive device is taken to mean a drive device for a single-track motor vehicle, thus in particular a motorcycle, wherein this drive device is designed to provide drive power to overcome driving resistances. In the sense of the invention, an internal combustion engine is taken to mean a thermal engine which is designed to provide drive power. Preferably, such an internal combustion engine has a reciprocating piston design and can operate by the so-called Otto principle. Such an internal combustion engine comprises a so-called crankshaft in order to output the drive power.

In the sense of the invention, a shiftable transmission is taken to mean a mechanism for transmitting the drive power from the internal combustion engine in the direction of a drivable wheel, this transmission having a variable transmission ratio between a transmission input shaft and a transmission output shaft. Preferably, this shiftable transmission is designed as a gear transmission with a plurality of shifting stages which can change by discrete steps, and it is thus understood to be a speed changing transmission. Such different discrete transmission ratios of the shiftable transmission are known as so-called gears or shifting stages.

In the sense of the invention, a transmission housing is taken to mean a mechanism for receiving and supporting of transmission shafts of the shiftable transmission. Such a transmission housing is designed in particular to hold transmission fluid. Preferably, the transmission housing comprises aluminum or an aluminum alloy as one component or it consists of one of these materials. Again preferably, the transmission housing is designed as a single piece with a crankcase of an internal combustion engine or preferably as a separate component from this.

In the sense of the invention, a transmission input shaft is taken to mean a transmission shaft of the shiftable transmission which is designed to receive the drive power from the internal combustion engine and supply it to the shiftable transmission. In terms of the torque transfer from the internal combustion engine to a drivable wheel, the transmission input shaft is the first transmission shaft of the shiftable transmission. Preferably, a primary gear wheel is arranged on the transmission input shaft and it can be connected to it in a rotationally fixed manner. Again preferably, the primary gear wheel stands in engagement with a primary pinion and this gear pair is designed to transfer drive power, which can be furnished by the internal combustion engine, to the transmission input shaft. Preferably, the primary pinion can be connected in a rotationally fixed manner to the power takeoff shaft of the internal combustion engine, preferably to its crankshaft. Again preferably, the primary pinion is arranged concentric to the power takeoff shaft of the internal combustion engine and the primary gear wheel is preferably arranged concentric to the transmission input shaft.

The primary pinion is in this case mounted rotatably about a primary pinion axis, and the primary gear wheel is mounted rotatably about a transmission input shaft axis. The transmission input shaft is rotatably mounted in a transmission input shaft bearing. The transmission input shaft bearing is arranged in a bearing plate. Preferably, the transmission input shaft is rotatably mounted in the transmission input shaft bearing and a further transmission input shaft bearing. Preferably, the distance between these two bearings is greater than 100 mm and less than 250 mm and preferably this distance is at least substantially 150 mm.

Preferably, at least one of the transmission input shaft bearings is designed as a roller bearing and preferably as a deep-groove ball bearing and especially preferably these two bearings (transmission input shaft bearing, further transmission input shaft bearing) are designed as deep-groove ball bearings. In particular, deep-groove ball bearings make possible slight skewing of the components being mounted in relation to a mounting axis. A slight skewing in the sense of the invention is understood to be a skewing in the range of a few angular minutes or less, preferably +/− 10 angular minutes or less, preferably +/− 7 angular minutes or less and especially preferably +/− 4 angular minutes or less. In particular, thanks to this tolerance of deep-groove ball bearings in regard to a skewing of the bearing axis it is possible for one of the transmission input shaft bearings to be immovable and the other to be received in the bearing plate for purposes of adjusting the axial spacing (primary pinion axis/transmission input shaft axis), without this negatively affecting a bearing service life. Studies have shown that an adjustability in the mentioned angle range results in a changing of the axial spacing of the primary pinion axis relative to the transmission input shaft axis in the range of several tenths of a millimeter.

Preferably, the primary gear wheel and the primary pinion have a slight meshing angle α. A slight meshing angle in the sense of the invention is taken to mean a meshing angle of less than 20°. Preferably, a slight meshing angle is chosen from a range which is preferably less than 20°, preferably less than 18° and especially preferably less than or equal to 16° and further preferably this range is greater than 10°, preferably greater than 13° and especially preferably greater than 15°. Especially with a meshing angle from the mentioned range it has been found that the adjustment range of the axial spacing of a few tenths of a millimeter is large enough to make possible an advantageous adjustment. Further, studies have shown that meshing angles larger than the mentioned range often result in a high sensitivity of the noise behavior of the gear wheels to manufacturing deviations, which is undesirable, and meshing angles which are smaller than the indicated range generally mean that the adjustment range for the axial spacing with a few tenths of a millimeter is too small.

In the sense of the invention, a bearing plate is understood to be a component designed to hold the transmission input shaft bearing and which can be connected to the transmission housing and can be displaced relative to it during the assembly process. Moreover, the transmission input shaft is arranged in this transmission input shaft bearing concentrically to the transmission input shaft axis and mounted rotatably with respect to the transmission housing, and the axial spacing of the primary pinion axis from the transmission input shaft axis can be adjusted thanks to the displacement of the bearing plate.

In the sense of the invention, a drivable wheel is taken to mean a wheel/tire combination which is designed to deliver the drive power furnished by the internal combustion engine onto a roadway surface; in the case of a motorcycle, this is generally the rear wheel, i.e., in particular, a rear wheel rim and a rear tire mounted on it. Preferably, the wheel/tire combination can be supplied with power from the shiftable transmission via a traction drive, especially via a chain drive or via a cardan drive.

For the changing of the position of the transmission input shaft and thus the transmission input shaft axis with respect to the primary pinion axis, the motorcycle drive device has an adjusting mechanism. The adjusting mechanism is designed in particular to enable a changing of the position of the bearing plate with respect to the transmission housing. The adjustment movement which can be produced by the adjusting mechanism is designed so that the axial spacing between the primary pinion axis and the transmission input shaft axis is changed, at least in the region of the primary pinion and the primary gear wheel. In particular, this changeability of the axial spacing makes it possible to adjust this to a predetermined nominal value and thus an improved motorcycle drive device is conceivable.

In one preferred embodiment of the invention, the bearing plate can be connected to the transmission housing at a pivot point of the bearing plate about an axis of rotation of the bearing plate. Preferably, the bearing plate has a recess or preferably a raised section, in order to produce a positive locking with the transmission housing at the bearing plate pivot point. Preferably, the bearing plate can be connected to the transmission housing with a pin/bolt connection, preferably a pin or bolt which is designed to form this positive locking is formed as a single piece with the bearing plate or preferably with the transmission housing, and especially preferred is a connection pin or bolt designed as a separate component from the bearing plate and the transmission housing. Such a single-piece bolt or pin can be construed as raised regions. Preferably, the other respective component has a recess to receive this raised region. Preferably, the adjusting mechanism is arranged on a section of the bearing plate situated opposite the bearing plate pivot point. In particular, thanks to such an arrangement, especially low forces occur when moving the bearing plate relative to the transmission housing.

In one preferred embodiment of the invention, the adjusting mechanism for changing the position of the bearing plate comprises an eccentric mechanism with an eccentric shaft. Preferably, the eccentric mechanism can be connected to the transmission housing and to the bearing plate. Preferably the eccentric shaft is rotatably mounted about a first eccentric axis, stationary with respect to the transmission housing, for changing the axial spacing between the transmission input shaft axis and the primary pinion axis. Further preferably, a positive locking can be produced by means of the eccentric shaft between the bearing plate and this eccentric shaft and between the transmission housing and this eccentric shaft. Such eccentric mechanisms are known in themselves from the prior art and therefore an especially simple motorcycle drive device with adjustable bearing plate having such a mechanism is conceivable.

In one preferred embodiment of the invention, the eccentric shaft has a second eccentric axis. This second eccentric axis is offset with respect to the first eccentric axis, i.e., it is axially parallel to but radially spaced apart from it, as is customary for an eccentric shaft. Further preferably, this second eccentric axis is stationary with regard to the bearing plate and thus the bearing plate can move by a rotation of the eccentric shaft. In particular, a rotation of the eccentric shaft about the first eccentric axis results in the changing of the position of the bearing plate with respect to the transmission housing, in particular, a rotary or swiveling movement about the pivot point of the bearing plate. Preferably, a fixation element is arranged on the eccentric shaft; preferably, the eccentric shaft can be connected to a fixation element, and especially preferably the fixation element is formed as a single piece with the eccentric shaft.

Preferably, the fixation element has a fixation region. Further preferably, the fixation region is designed as a recess in the fixation element. Preferably, the fixation element can be secured by a fastening means to the transmission housing or preferably on the bearing plate. Preferably, the fixation region is designed to form a durable connection, preferably a durable positive locking or preferably frictional locking connection to the transmission housing/bearing plate. Preferably, the fastening means is designed as a screw, preferably a fastening screw. Preferably, a normal force can be applied by means of the fastening screw to the fixation element and consequently the fixation element is held by friction locking and especially immovably with respect to the transmission housing or the bearing plate.

In the sense of the invention, a durable connection is taken to mean a connection which continues to exist, i.e., durably exists, after the mounting of the motorcycle drive device and during its regular operation. A durable connection is to be distinguished especially as opposed to a temporary connection, such as one that is made in particular during or for an assembly process and which is removed once more after it is finished, i.e., it does not exist during the regular operation of the motorcycle drive device. An especially reliable connection of the eccentric shaft is made possible especially by means of such a durable connection of the eccentric shaft via the fixation region to the transmission housing and/or the bearing plate.

In one preferred embodiment, the fixation element has a detent region. Preferably, this detent region is designed to produce a temporary connection of the eccentric shaft to the transmission housing or preferably to the bearing plate. Preferably, the detent region has, for the making of this temporary connection, at least one recess, preferably 2 or more recesses. Preferably, the detent region is situated at a distance from the fixation region. Preferably, the detent region is designed to detain the fixation element with respect to the transmission housing/bearing plate in discrete positions, especially for the duration of an assembly process and not during regular operation.

Further preferably, this makes possible an adjusting of the axial spacing between the primary pinion axis and the transmission input shaft axis in discrete steps. Preferably, a detent element is provided for making the temporary connection. In particular, the adjustability of the axial spacing in discrete steps on the one hand provides an especially simple adjustment possibility, and on the other hand it is possible to check the adjustment at a later time, since in the event that the adjustment position lies between two discrete steps, an unplanned displacement of the bearing plate has occurred during the regular operation.

In one preferred embodiment of the invention, the motorcycle drive device has a further adjustable bearing plate, preferably of the above described kind. In an embodiment of the invention with only a single adjustable bearing plate, a skewing of the transmission input shaft axis relative to the primary pinion axis may occur due to a movement of the position of the bearing plate. This skewing may be explained in particular by the fact that the transmission input shaft can be mounted in the transmission by means of two transmission input shaft bearings, one of which is received in the bearing plate and can be shifted along with it, and the other of these bearings is fixed in the transmission housing.

The use of a second adjustable bearing plate, while on the one hand causing an increased cost for construction of the transmission housing, on the other hand makes it possible to displace the transmission input shaft axis axially parallel to the primary pinion axis. Preferably, for this, the further adjustable bearing plate has a further adjusting mechanism for changing the position of the further bearing plate with respect to the transmission housing. Preferably, one of the transmission input shaft bearings is arranged in the further adjustable bearing plate and the other transmission input shaft bearing is arranged in the adjustable bearing plate and thereby makes possible an axially parallel displacement of the transmission input shaft axis relative to the primary pinion axis.

According to the invention, a method is provided for adjusting a backlash with a motorcycle drive device of the above described kind. In such a method, first of all a starting backlash between the primary pinion and the primary gear wheel is detected. After this, this starting backlash is compared to a nominal backlash. These backlashes may be determined by indirect or direct measurement values/methods. After the starting backlash has been compared to the nominal backlash, a nominal position of the adjustable bearing plate with respect to the transmission housing is adjusted, based on this comparison, by means of the adjusting mechanism, wherein an actual backlash between the primary pinion and the primary gear wheel is formed. This actual backlash corresponds at least substantially to the nominal backlash which can be predetermined. An especially advantageous operating behavior of the motorcycle drive device is established in particular by such an adjusting of the actual backlash.

In one preferred embodiment of the method for adjusting the backlash, after the bearing plate has been brought into the nominal position with the adjusting mechanism, the fixation element is connected to the transmission housing with a detent element in the detent region. Preferably, the detent element is designed as a positive locking connector, preferably as a setting pin or preferably as a detent pin. This connection of the fixation element by means of the detent region and with the detent element can preferably produce a temporary connection between the eccentric shaft and the transmission housing/bearing plate, thus hindering a twisting of the eccentric shaft relative to the transmission housing for the assembly processes. In particular, thanks to this temporary connection, the bearing plate is temporarily held in the nominal position and further assembly steps can be performed. In particular, such a temporary connection makes possible an especially mistake-proof mounting of the motorcycle drive device. In another preferred embodiment, a positive locking connector also remains during regular operation of the motorcycle drive device and thereby in particular enables an especially secure fixation of the position of the fixation element.

In one preferred embodiment of the method for adjusting the backlash, the bearing plate preferably after being held in the nominal position by means of the detent element is connected to the transmission housing by further fastening means. Preferably, these further fastening means are designed as screws, preferably as further fastening screws. In particular, thanks to these further fastening means the bearing plate and thus the transmission input shaft are held durably in the same position relative to the transmission housing and a secure operation of the motorcycle drive device is made possible.

In one preferred embodiment of the method for adjusting the backlash, the fixation element is connected in the fixation region by means of a fastening means to the transmission housing or to the bearing plate. Preferably after this connecting, the detent element is removed; preferably the detent element may also be removed even before the fixation element is connected in the fixation region by means of the fastening means to the transmission housing. In particular, thanks to this connection with the fastening means, the fixation element is also held durably in its position, and thus a change in the position of the bearing plate with respect to the transmission housing is further prevented.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
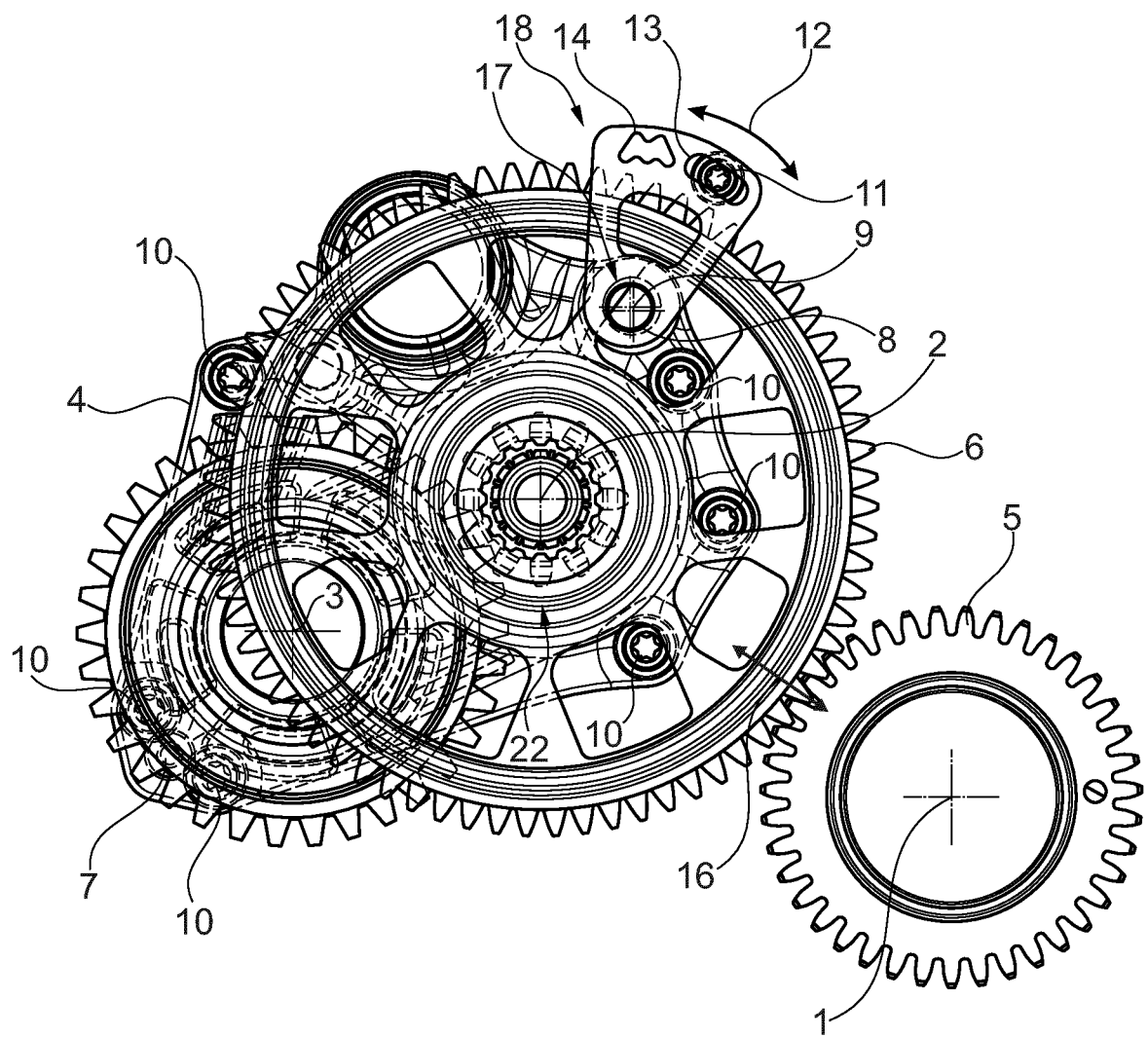
FIG. 1 shows a wireframe model of a transmission with adjustable axial spacing in accordance with an embodiment of the present invention.

FIG. 1 shows a wireframe model of a transmission of a motorcycle drive device with an adjustable axial spacing between the primary pinion axis 1 and the transmission input shaft axis 2. The transmission input shaft is mounted rotatably about the transmission input shaft axis 2, and on this transmission input shaft the primary gear wheel 6 is arranged, fixed axially and fixed in rotation. The primary gear wheel 6 meshes for the power transmission with the primary pinion 5, and thus stands in engagement with it. The primary pinion 5 is mounted rotatably about the primary pinion axis 1 and connected in axially and rotationally fixed manner to a power takeoff shaft of an internal combustion engine (not shown).

One of the transmission input shaft bearings 22, in which the transmission input shaft is rotatably mounted, is arranged in the transmission cover 4, designed as a bearing plate. The transmission cover 4 is connected durably to the transmission housing (not shown) by means of a plurality of further fastening means, which are designed as fastening screws 10. Besides the transmission input shaft axis 2, the motorcycle drive device has at least one further axis 3, about which further transmission axes are rotatably mounted, in the present instance, the transmission output shaft. From the transmission output shaft, the drive power which can be furnished by the internal combustion engine is transferred on in the direction of the rear wheel of the motorcycle.

The transmission cover 4 can be moved in direction 16 by an adjusting mechanism (8, 9, 11, 13, 14). For this, the transmission cover 4 is pivotably connected via the pivot point 7 to the transmission housing (not shown). The adjusting mechanism has an eccentric shaft 17 and is arranged on an opposite side of the bearing cover, as regards the pivot point 7. The eccentric shaft 17 is connected in a rotationally fixed manner to the fixation element 18. The eccentric shaft 17 has a transmission housing axis of rotation 8 (first eccentric shaft), which is arranged stationary in regard to the transmission housing (not shown), and a transmission cover axis of rotation 9 (second eccentric shaft), which is arranged stationary in regard to the transmission cover 4. By a movement of the fixation element 18 in direction 12, the eccentric shaft 17 is turned and a movement of the transmission cover 4 in direction 16 is produced.

The fixation element 18 has a detent region 14, which is designed for the positive locking yet temporary connection of the fixation element 18 to the transmission housing (not shown). Using this detent region 14, a nominal position of the transmission cover 4 can be found, in which a predeterminable axial spacing is set between the primary pinion axis 1 and the transmission input shaft axis 2.

If the desired nominal position of the transmission cover 4 has been found and temporarily secured, i.e., locked, during the assembly of the motorcycle drive device, the fixation element 18 can be durably connected to the transmission housing (not shown) via the fixation region 13 by means of the fixation screw 11, which is designed as a fastening screw. Using the fixation screw 11, the position of the fixation element 18 and thus the eccentric shaft 17 and the transmission cover 4 relative to the transmission housing is durably secured.

Figure 2:
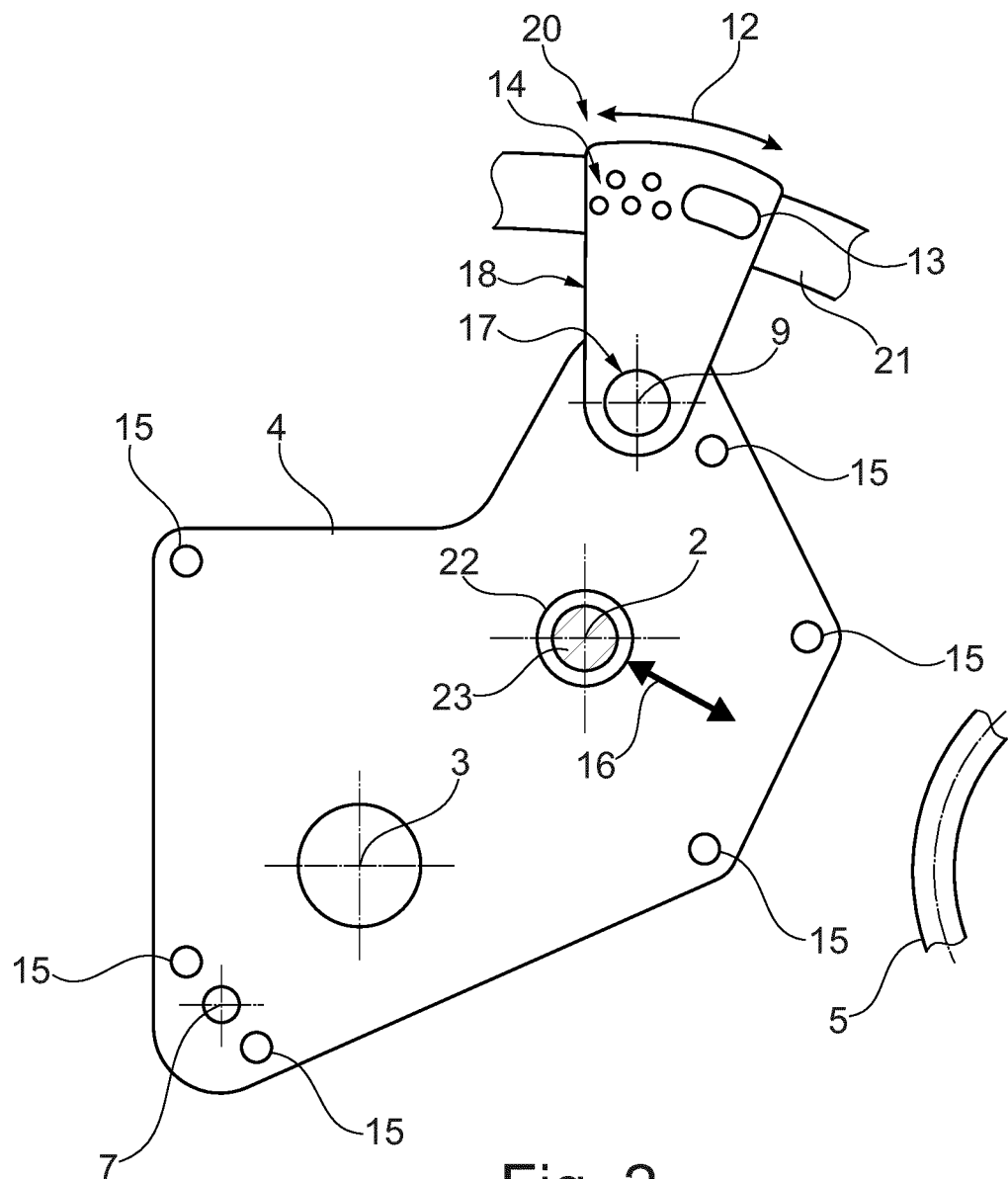
FIG. 2 shows a simplified representation of a bearing plate with the corresponding adjusting mechanism in accordance with an embodiment of the present invention.

FIG. 2 shows a top view of the transmission cover 4 with adjusting mechanism 20 of the motorcycle drive device. The detent region 14 has a plurality of individual boreholes. The fixation region 13 is designed as an oblong hole in order to allow a displacement in direction 12 for the fixation element 18. The fixation element 18 can be connected by positive locking to the transmission housing 21 by using the detent region 14 as well as the fixation region 13. The transmission cover axis of rotation 9 of the eccentric shaft 17 is arranged stationary with respect to the housing cover 4. The housing cover 4 has a plurality of boreholes 15 to receive the further fastening means, which are designed as fastening screws (not shown). Further, the housing cover 4 is connected to the transmission housing 21 pivotably about the pivot point 7. The transmission input shaft 23 is mounted in the transmission input shaft bearing 22 rotatably about the transmission input shaft axis 2 and the primary gear wheel (not shown) is arranged on the transmission input shaft 23 and stands in engagement with the primary pinion 5 for the power transfer.

A rotary movement of the fixation element 18 in direction 12 results in a movement of the transmission cover 4 in direction 16 and thus the axial spacing between the primary pinion axis (not shown) and the transmission input shaft axis 2 can be adjusted in the regions of the primary pinion 5 and the primary gear wheel.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motorcycle drive device, comprising:
    an internal combustion engine with a crankshaft configured to output a drive power; and
    a transmission with a transmission housing, the transmission being configured to transmit the drive power from the internal combustion engine toward a drivable wheel, the transmission including
        a transmission input shaft arranged on a transmission input shaft axis and configured to receive the drive power,
        a primary gear wheel arranged on the transmission input shaft,
        a primary pinion arranged on a primary pinion axis and in engagement with the primary gear wheel, the primary pinion being configured to transfer the drive power from the crankshaft to the primary gear wheel,
        a transmission input shaft bearing arranged concentrically with the transmission input shaft, and
        a bearing plate configured to receive the transmission input shaft bearing,
    wherein
        the bearing plate includes an adjusting mechanism between the bearing plate and the housing, the adjustment mechanism being configured to change a position of the bearing plate with respect to the transmission housing such that an axial spacing between the primary pinion axis and the transmission input shaft axis at the primary pinion and primary gear wheel engagement location is changeable.

2. The motorcycle drive device as claimed in claim 1, wherein
    the bearing plate is rotatably connected to the transmission housing at a pivot point corresponding to an axis of rotation of the bearing plate.

3. The motorcycle drive device as claimed in claim 2, wherein
    the adjusting mechanism for changing the position of the bearing plate includes an eccentric mechanism with an eccentric shaft, and
    the eccentric mechanism extends between the transmission housing and the bearing plate such that the eccentric shaft is rotatable about a first eccentric axis on the transmission housing to change the axial spacing between the primary pinion axis and the transmission input shaft axis.

4. The motorcycle drive device as claimed in claim 3, wherein
the eccentric shaft is rotatable about a second eccentric axis on the bearing plate, the second eccentric axis being axially parallel to and radially spaced apart from the first eccentric axis, such that rotation of the eccentric shaft about the first eccentric axis changes the position of the bearing plate with respect to the transmission housing,
the eccentric shaft is connected in a rotatably fixed manner to a fixation element secured to the transmission housing, the fixation element having a fixation region at which the fixation element is connected to the transmission housing, and
when the fixation element is rotatably fixed to the transmission housing, a rotary movement of the eccentric shaft about the first eccentric axis is prevented.

5. The motorcycle drive device as claimed in claim 4, wherein
the fixation element includes a detent region having at least two recesses for positioning the fixation element with respect to the transmission housing in discrete positions.

6. The motorcycle drive device as claimed in claim 5, further comprising:
a further bearing plate having a further adjusting mechanism for changing a position of the further bearing plate with respect to the transmission housing, and
a further transmission input shaft bearing concentrically located on the transmission input shaft spaced axially away from the transmission input shaft bearing adjacent to the primary gear wheel,
wherein the further transmission input shaft bearing is received on the further bearing plate.

7. A method for adjusting a backlash of a motorcycle drive device, the motorcycle drive device including an internal combustion engine with a crankshaft configured to output a drive power and a transmission with a transmission housing, the transmission being configured to transmit the drive power from the internal combustion engine toward a drivable wheel, the transmission including a transmission input shaft arranged on a transmission input shaft axis and configured to receive the drive power, a primary gear wheel arranged on the transmission input shaft, a primary pinion arranged on a primary pinion axis and in engagement with the primary gear wheel, the primary pinion being configured to transfer the drive power from the crankshaft to the primary gear wheel, a transmission input shaft bearing arranged concentrically with the transmission input shaft, and a bearing plate configured to receive the transmission input shaft bearing, the bearing plate including an adjusting mechanism between the bearing plate and the housing, the adjustment mechanism being configured to change a position of the bearing plate with respect to the transmission housing such that an axial spacing between the primary pinion axis and the transmission input shaft axis at the primary pinion and primary gear wheel engagement location is changeable, comprising the acts of;
determining a starting backlash between the primary pinion and the primary gear wheel;
adjusting the position of the bearing plate with respect to the transmission housing to a nominal position corresponding to a predetermined nominal backlash.

8. The method for adjusting the backlash as claimed in claim 7, further comprising the act of:
after adjusting the bearing plate to the nominal position, engaging a detent element of a detent region of the adjusting mechanism with the transmission housing such that the bearing plate is held in the nominal position.

9. The method as claimed in claim 8, further comprising the act of:
after engaging the detent element to hold the bearing plate in the nominal position, fixing the adjusting mechanism to the transmission housing with a fastener.

10. The method as claimed in claim 9, wherein
the bearing plate is rotatably connected to the transmission housing at a pivot point corresponding to an axis of rotation of the bearing plate,
the adjusting mechanism for changing the position of the bearing plate includes an eccentric mechanism with an eccentric shaft,
the eccentric mechanism extends between the transmission housing and the bearing plate such that the eccentric shaft is rotatable about a first eccentric axis on the transmission housing to change the axial spacing between the primary pinion axis and the transmission input shaft axis,
the eccentric shaft is rotatable about a second eccentric axis on the bearing plate, the second eccentric axis being axially parallel to and radially spaced apart from the first eccentric axis, such that rotation of the eccentric shaft about the first eccentric axis changes the position of the bearing plate with respect to the transmission housing, and
the eccentric shaft is connected in a rotatably fixed manner to a fixation element secured to the transmission housing, the fixation element having a fixation region at which the fixation element is connected to the transmission housing such that when the fixation element is rotatably fixed to the transmission housing, a rotary movement of the eccentric shaft about the first eccentric axis is prevented,
further comprising the act of:
after fixing the adjusting mechanism to the transmission housing, removing the detent element.

\* \* \* \* \*